United States Patent [19]
Herbert et al.

[11] Patent Number: 6,148,315
[45] Date of Patent: Nov. 14, 2000

[54] FLOATING POINT UNIT HAVING A UNIFIED ADDER-SHIFTER DESIGN

[75] Inventors: Jeffrey C. Herbert, Nazareth, Pa.; Razak Hossain, Bridgewater; Roland A. Bechade, Branchburg, both of N.J.

[73] Assignee: Mentor Graphics Corporation, Wilsonville, Oreg.

[21] Appl. No.: 09/071,358

[22] Filed: Apr. 30, 1998

[51] Int. Cl.[7] .................................. G06F 7/50; G06F 5/01
[52] U.S. Cl. ............................................. 708/505; 708/209
[58] Field of Search .................................... 708/505, 209

[56] References Cited

U.S. PATENT DOCUMENTS

| | | | |
|---|---|---|---|
| 5,016,209 | 5/1991 | Ikeda et al. | 708/505 |
| 5,166,898 | 11/1992 | Ishihara | 708/505 |
| 5,303,174 | 4/1994 | Okamoto | 708/505 |
| 5,726,926 | 3/1998 | Makino | 708/505 |
| 5,790,445 | 8/1998 | Eisen et al. | 708/505 |
| 5,954,790 | 9/1999 | Wong | 708/505 |

*Primary Examiner*—David H. Malzahn
*Attorney, Agent, or Firm*—Blakely, Sokoloff, Taylor & Zafman LLP

[57] ABSTRACT

An improved floating point unit is disclosed. The floating point unit includes a combined adder-shifter that operates to shift a mantissa portion of at least one floating point operand to align the floating point operand with another floating point operand. The combined adder-shifter includes an adder portion that operates to generate a number of sum bits for exponent difference between the two floating point operands. The adder portion favors generation time performance of lower order ones of the sum bits over generation time performance of higher order ones of the sum bits. The combined adder-shifter also includes a shifter portion that operates to shift the mantissa portion of the at least one floating point operand in accordance with the sum bits.

11 Claims, 14 Drawing Sheets

FLOATING POINT UNIT HAVING A UNIFIED ADDER-SHIFTER DESIGN

BACKGROUND OF THE INVENTION

1. Field of the Invention

The present invention relates to the field of digital data processing. More specifically, the present invention relates to the design of high speed floating point unit in a digital data processor.

2. Background Information

Floating point operation is one of the essential tasks repeatedly performed by many digital data processors. As a result, the floating point unit (FPU) is an essential part of a digital data processor. Much effort has been expanded to try to maximize the speed of FPUs, nevertheless, any further improvement on the speed of FPUs is still desirable.

During floating point operations, it is often necessary to determine the amount of right shift for a mantissa of a floating point number. The amount of right shift is equal to the difference between the exponents of the two floating point input operands. Thus, it is often necessary to perform a rapid addition/subtraction operation, and then followed by a shifting operation. Conventional FPU typically includes an adder to perform the addition/subtraction operation, and a separate barrel shifter to perform the shifting operation. Conventional FPU typically also attempts to maximize the performance of the FPU by maximizing the performance of the individual components. Thus, typically a high speed parallel adder and any one of a number of high speed barrel shifter would be employed.

This conventional approach suffers from at least one disadvantage in that high speed parallel adders typically achieve their improvement in performance by focusing on the critical paths. As a result, the generation speed for the lower sum bits are sacrificed in favor of the generation speed of the higher order sum bits that are on the critical paths. Since the shifting operation serially depends on the output sum bits of the adder, the conventional approach actually leads to less than optimal combined performance for the addition and shifting operations when viewed in totality.

Thus, an alternate approach that yields better overall combined performance for the addition and shifting operations is desired.

SUMMARY OF THE INVENTION

An improved floating point unit is disclosed. The floating point unit includes a combined adder-shifter that operates to shift a mantissa portion of at least one floating point operand to align the floating point operand with another floating point operand. The combined adder-shifter includes an adder portion that operates to generate a number of sum bits for exponent difference between the two floating point operands. The adder portion favors generation time performance of lower order ones of the sum bits over generation time performance of higher order ones of the sum bits. The combined adder-shifter also includes a shifter portion that operates to shift the mantissa portion of the at least one floating point operand in accordance with the sum bits.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Figure 1:
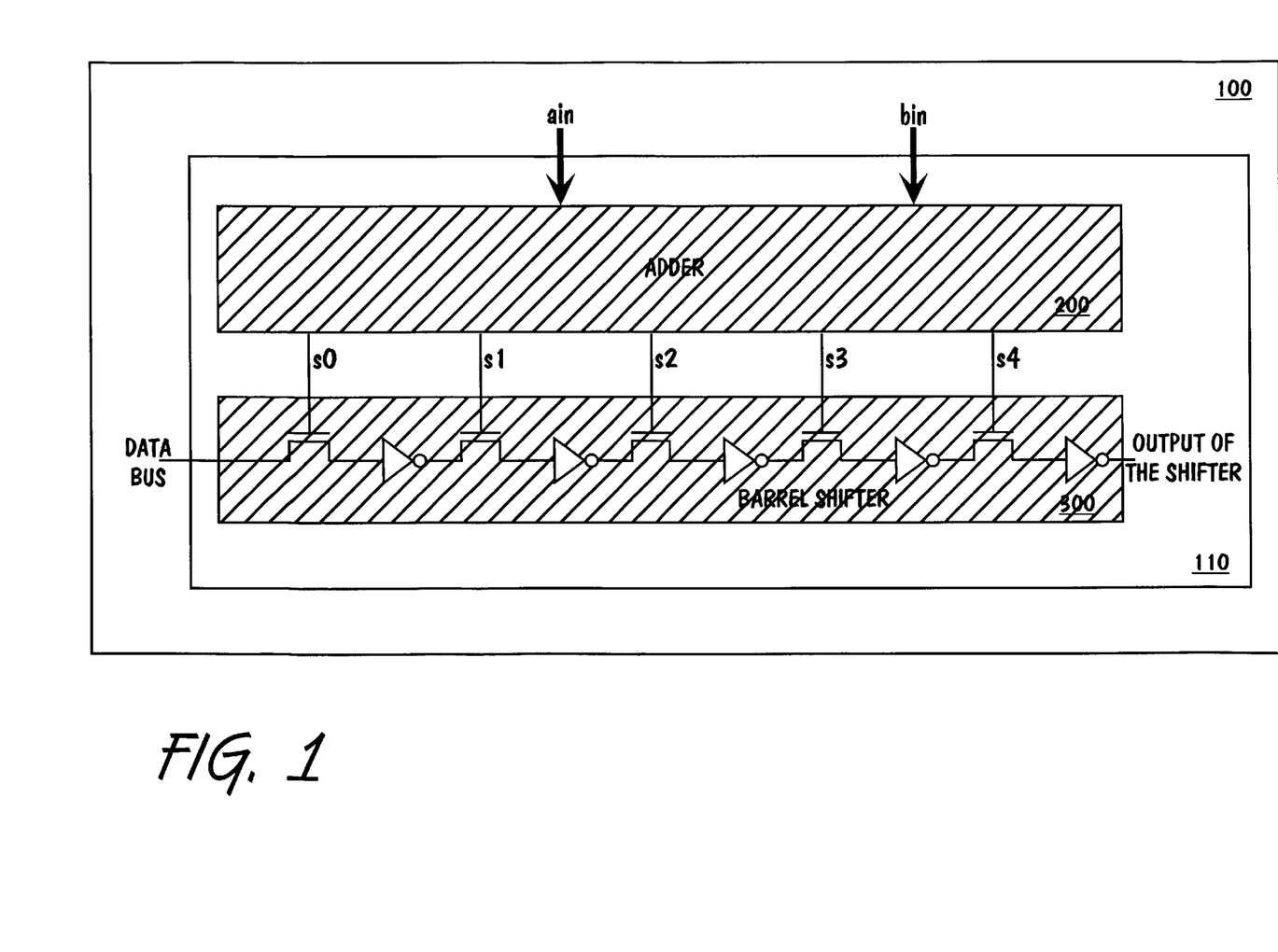
FIG. 1 illustrates an improved floating point unit incorporated with the combined adder-shifter of the present invention.

Referring now FIG. 1, wherein a block diagram illustrating one embodiment of a floating point unit of the present invention is shown. As shown, floating point unit 100 implemented in accordance with the present invention includes a combined shifter-adder 110 of the present invention. Combined shift-adder 110 is designed to achieve improved performance for the combined addition and shifting operations performed during alignment of a mantissa portion of a floating point operand to another floating point operand. In particular, combined adder-shifter 110 includes adder portion 200 that generates sum bits (s0–s4) for exponent difference for the two floating point operands, where adder portion 200 favors generation time performance of lower order ones of the sum bits (i.e. s0, s1 etc.) over higher order ones of the sum bits (i.e. s4, s3, etc.). Note that adder portion 200 actually performs a subtraction operation to generate s0–s4 for the exponent difference. Combined adder-shifter 110 further includes shifter portion 300 that shifts the mantissa portion of the floating point operand in accordance with the sum bits. For the illustrated embodiment, responsive to sum bits s0–s4, shifter portion 300 shifts either 0 or 1, 0 or 2, 0 or 4, 0 or 8, 0 or 16 bits respectively. In other words, shifter portion 300 may shift the input by 0 or as much as 32 bits. As a result of adder portion 200 favoring generation time performance of lower order ones of the sum bits over higher order ones of the sum bits, shifter portion 300 may commence the shifting operation before all sum bits are generated. In one embodiment, the successive generation time of the various sum bits are designed to approximate that of the propagation delays of the different shifting stages of shifter portion 300. As a further consequence, experience has shown that the combined performance of the subtraction and shifting operations is actually improved, notwithstanding the fact that the performance of the subtraction operation is slower when compared to conventional high performance parallel adders. Before combined adder-shifter 110 is described in further details, it should be noted that while for ease of understanding, five sum bits s0–s4 are shown in FIG. 1, the present invention may be practiced with more or less sum bits.

Figure 2A:
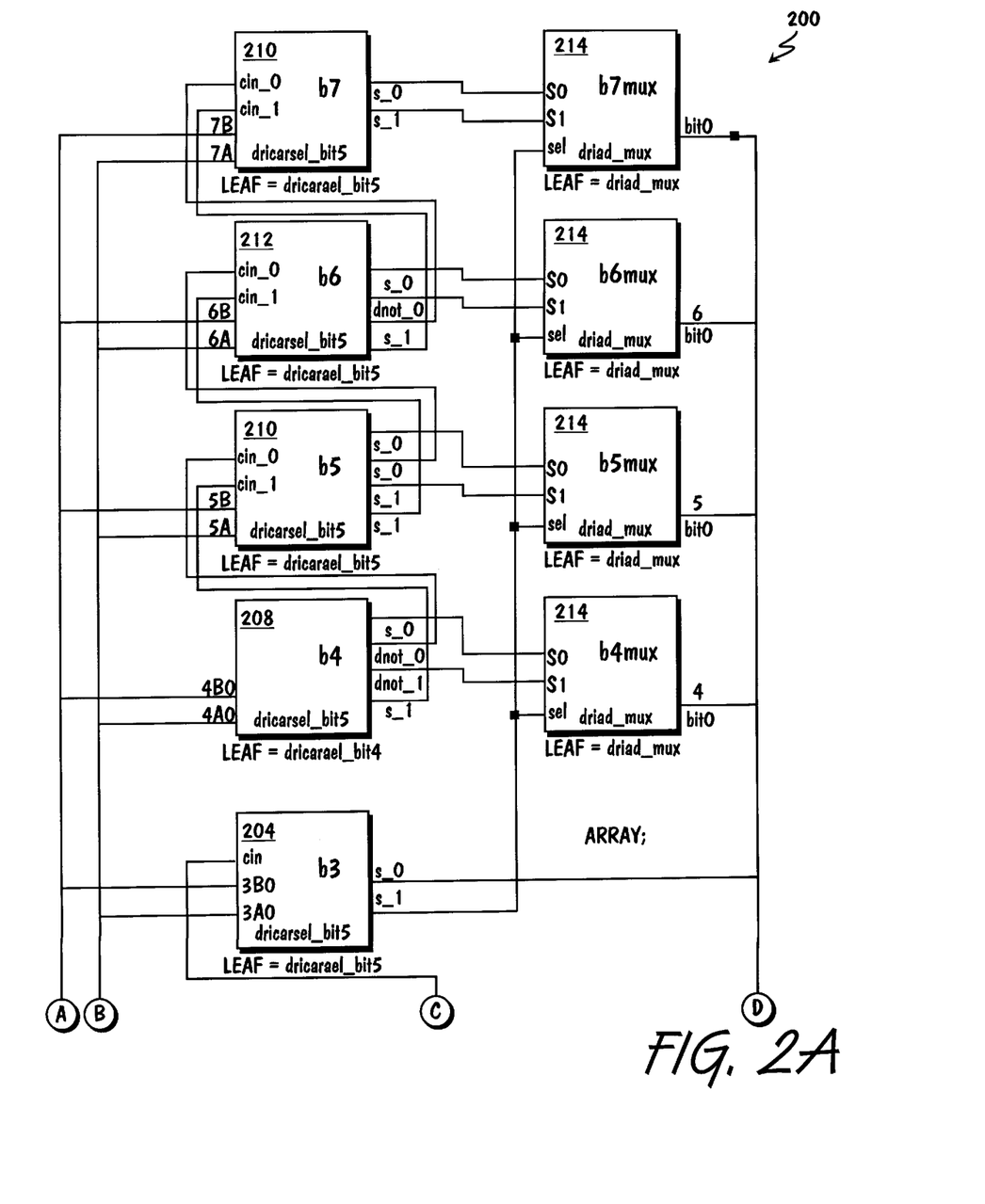
FIG. 2 illustrates one embodiment of the adder portion of the combined adder-shifter of FIG. 1.
Figure 2B:
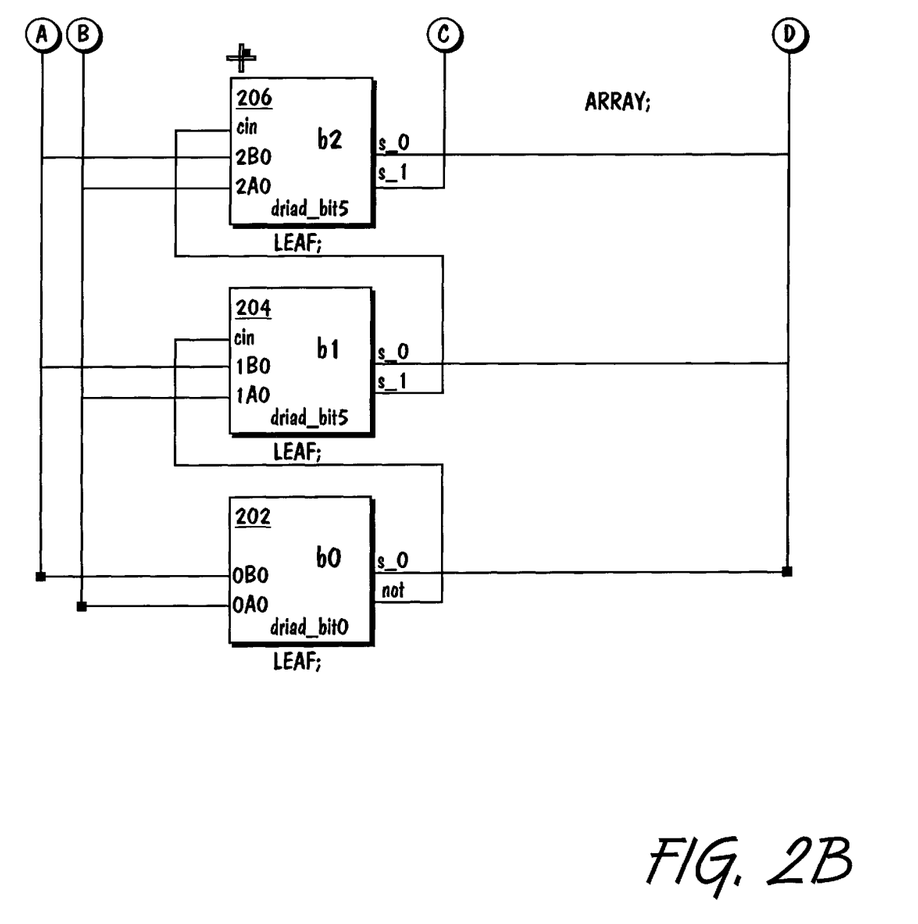

FIG. 2 illustrates one embodiment of adder portion 200 of combined adder-shifter 110 of FIG. 1. As shown, for the illustrated embodiment, adder portion 200 includes four computational cells (hereinafter simply cells), one cell 202, two cell 204 and one cell 206, serially coupled to each other to implement a ripple carry scheme for the lower order bits, i.e. b0–b3. Additionally, adder portion 200 includes another four computational cells, one cell 208, two cell 210 and one cell 212, and four selection cells 214, coupled to each other as shown, to implement a carry select scheme for the higher order bits, i.e. b4–b7. In other words, for the illustrated embodiment, adder portion 200 is a hybrid two addition scheme adder. Note also that cells 204 and 206, and cells 210 and 212 are used alternately. Those skilled in the art will appreciate that unlike conventional higher performance parallel adders, the hybrid ripple carry and carry select adder does not maximize the adder performance favoring generation times of the higher order bits on critical paths over generation times of the lower order bits. Instead, generation times of the lower order bits are favored over generation times of the higher order bits on critical paths.

Figure 3:
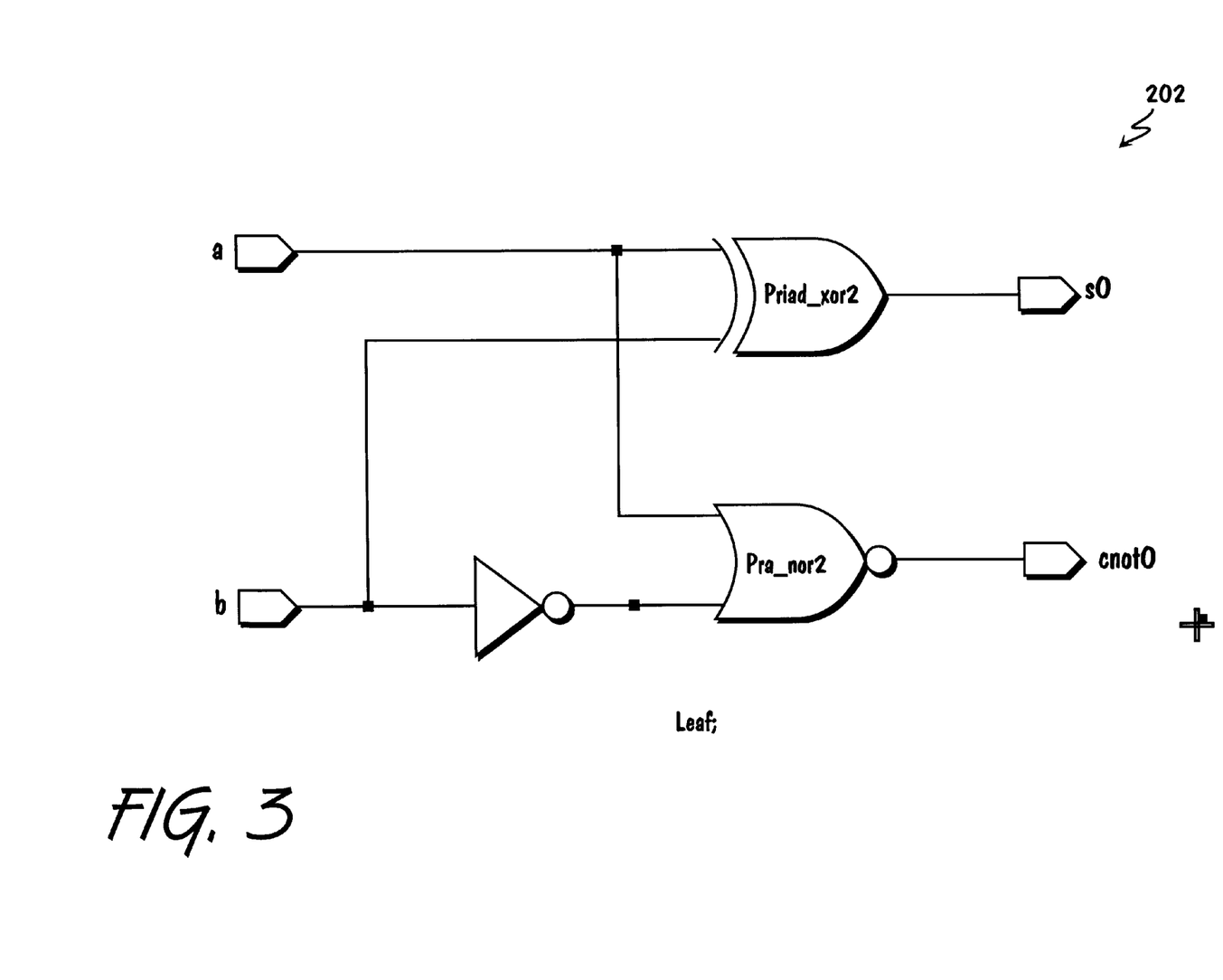
FIGS. 3–5 illustrate one embodiment each of the various lower order bit computational cells of FIG. 2.
Figure 4:
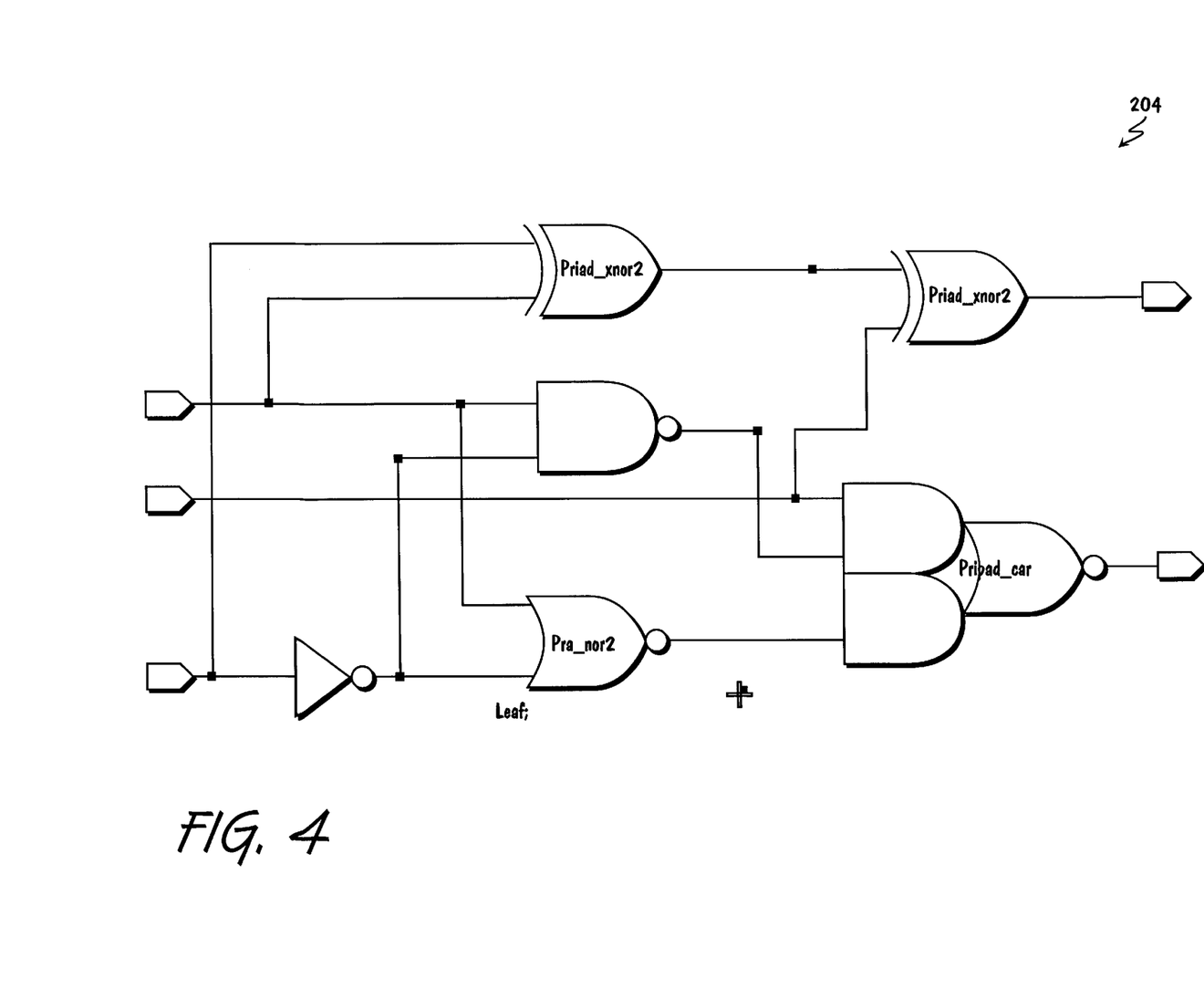
Figure 5:
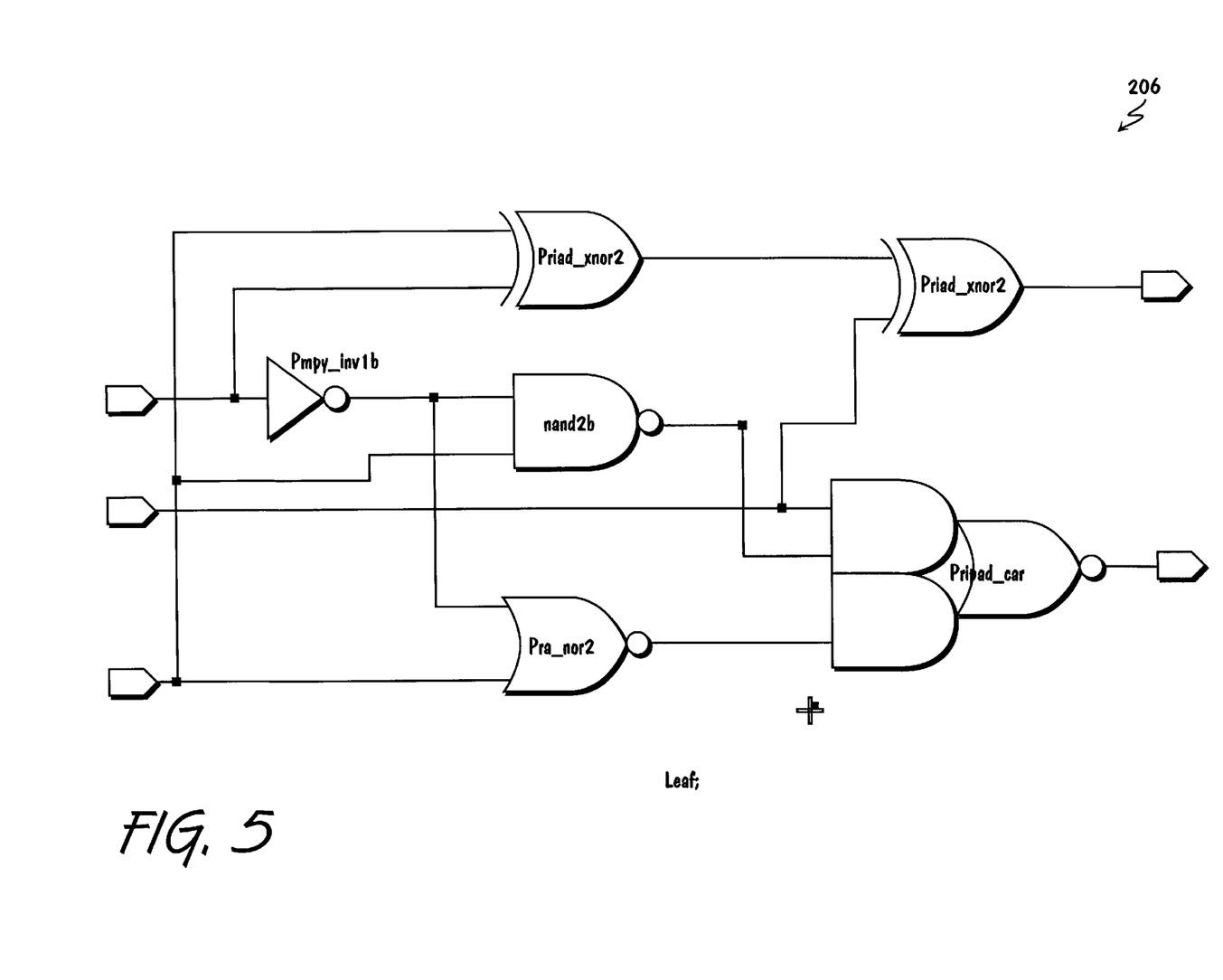
Figure 6:
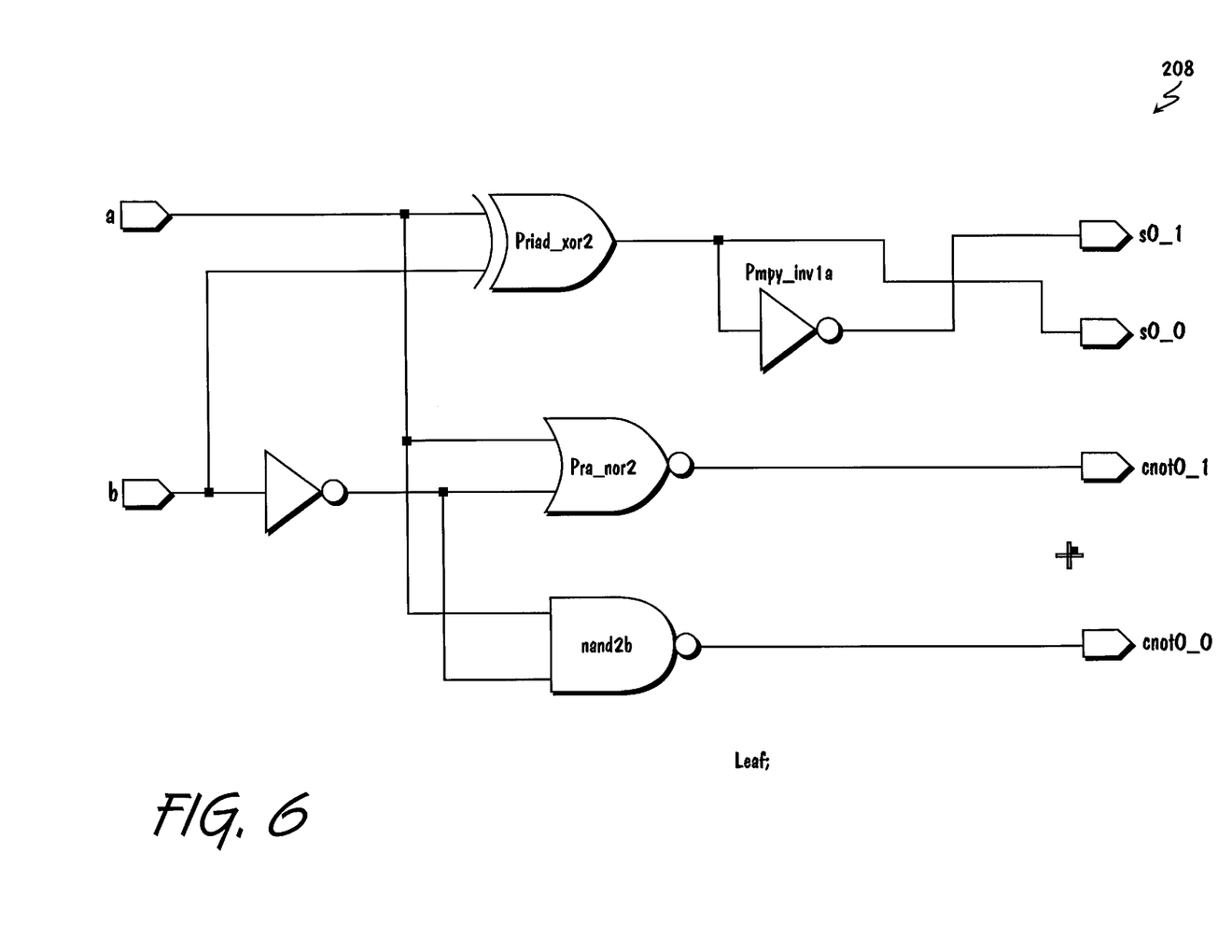
FIGS. 6–8 illustrate one embodiment each of the various higher order bit computational cells of FIG. 2.
Figure 7:
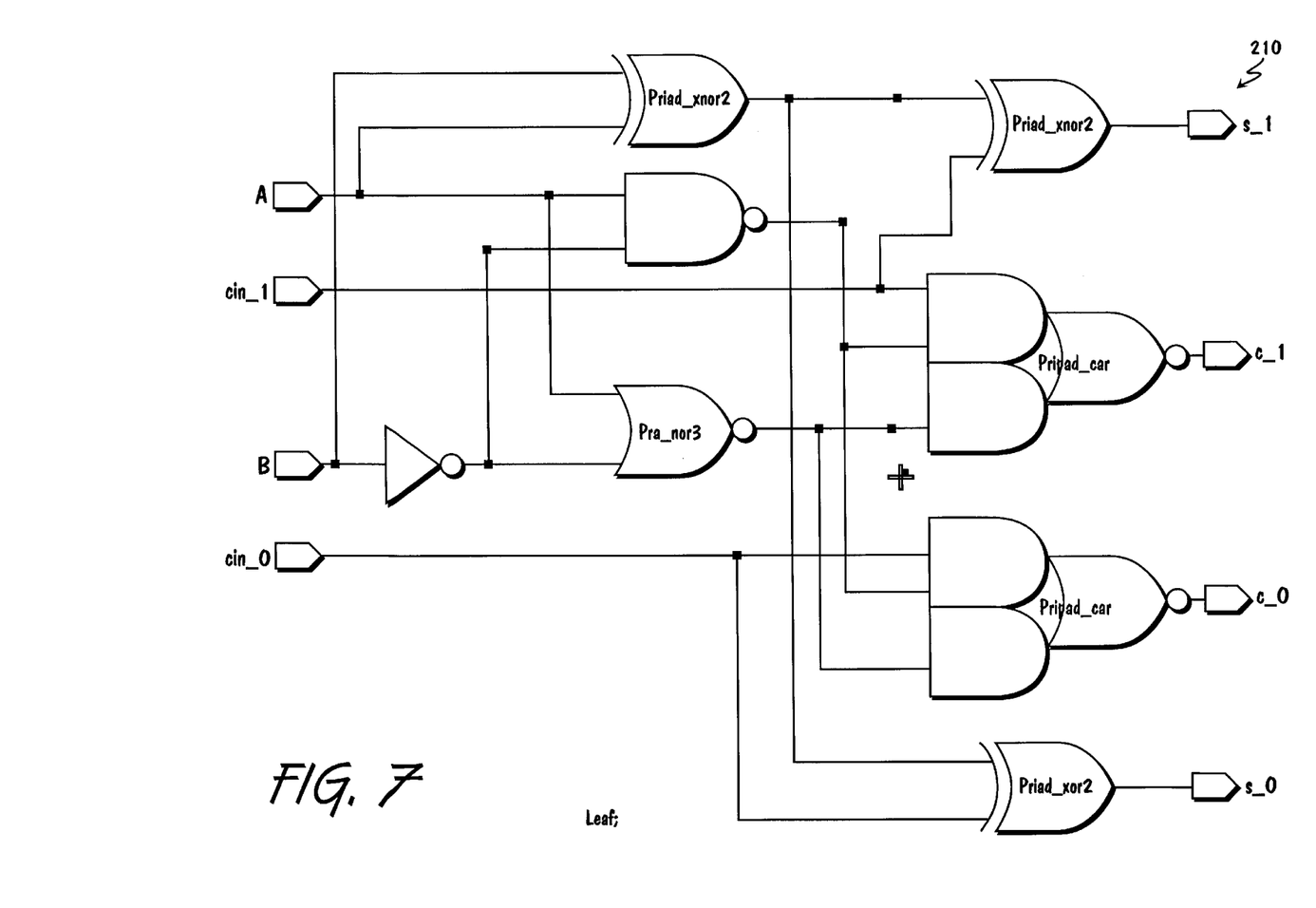
Figure 8:
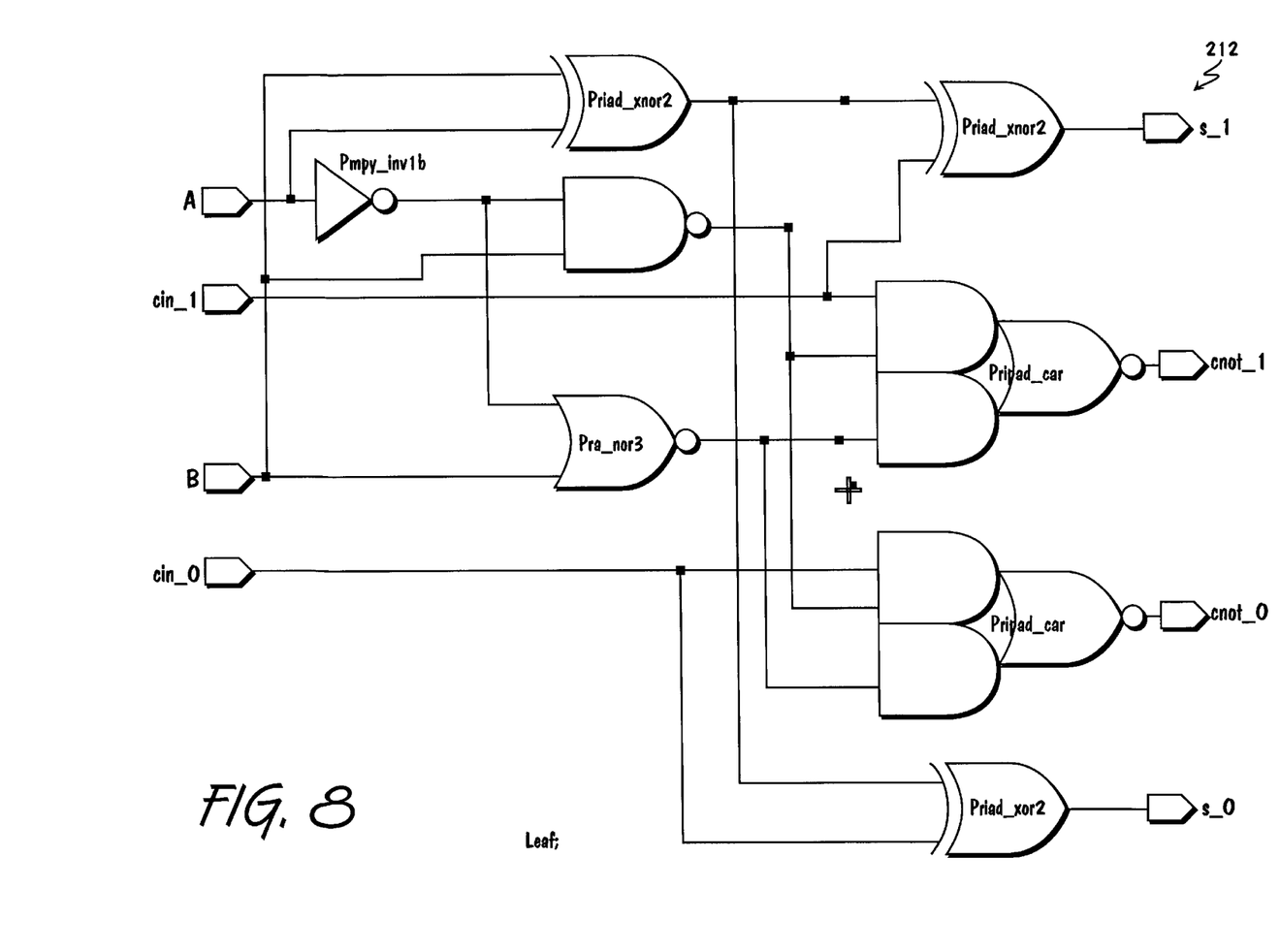
Figure 9:
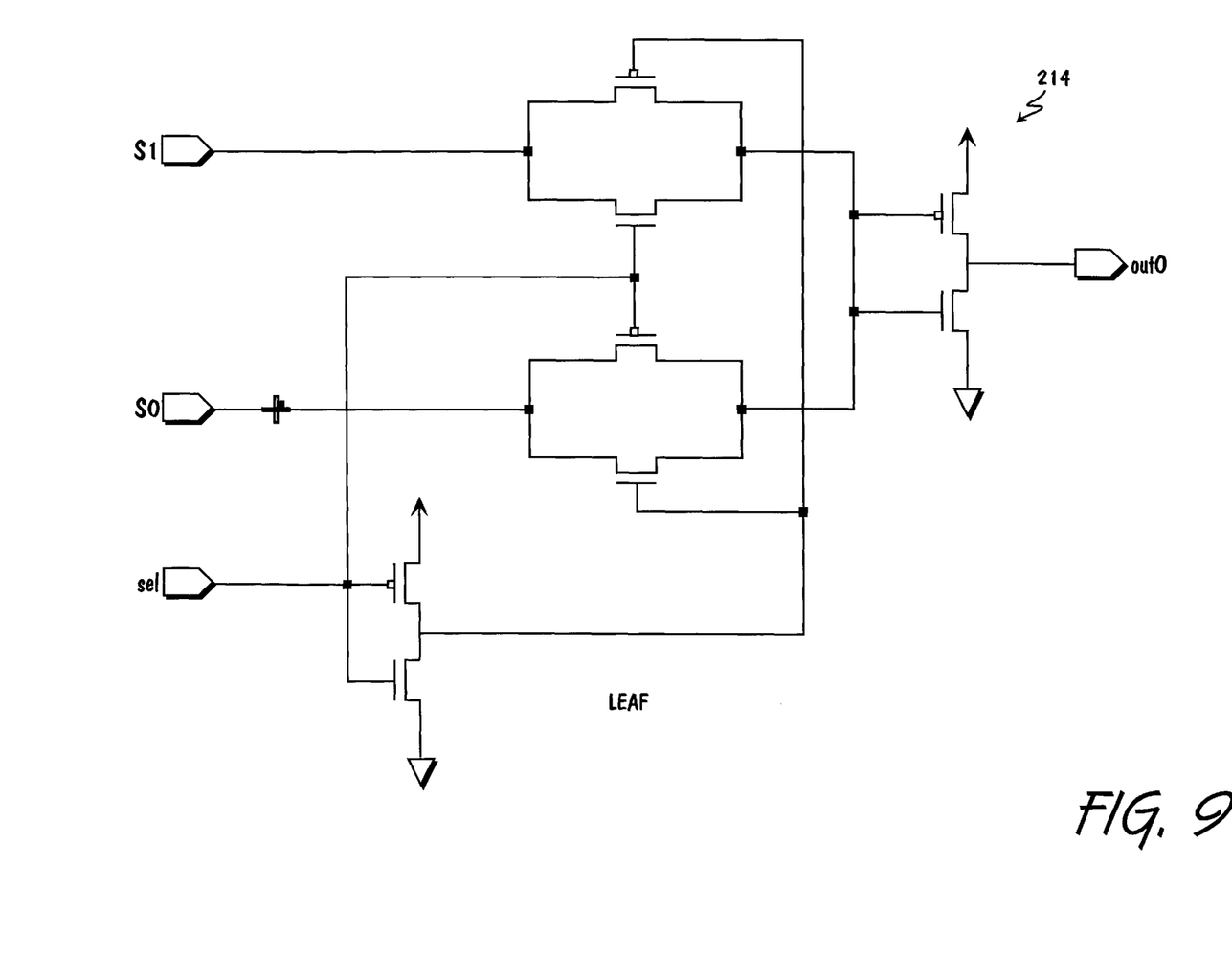
FIG. 9 illustrates one embodiment of a selection cell of FIG. 2.

FIGS. 3–5 illustrate one embodiment each for cells 202, 204 and 206 employing various XOR gates, AND gates, NOR gates and inverters coupled to each other as shown. The inverters are included for subtraction. The operation of these circuits, including their cooperation with each other, to effectuate the ripple carry scheme are apparent to those skilled in the art. Thus, these embodiments of cells 202, 204 and 206 will not be further described. Similarly, FIGS. 6–8 illustrate one embodiment each for cell 208, 210 and 212 employing also various XOR gates, AND gates, NOR gates and inverters coupled to each other as shown. Similarly, the inverters are included for subtraction. The operation of these circuits, including their cooperation with each other and with cells 214, to effectuate the carry-select scheme are apparent to those skilled in the art. Accordingly, these embodiments of cells 208, 210 and 212 will not be further described either. FIG. 9 illustrates one embodiment for a selection cell 214.

Figure 10:
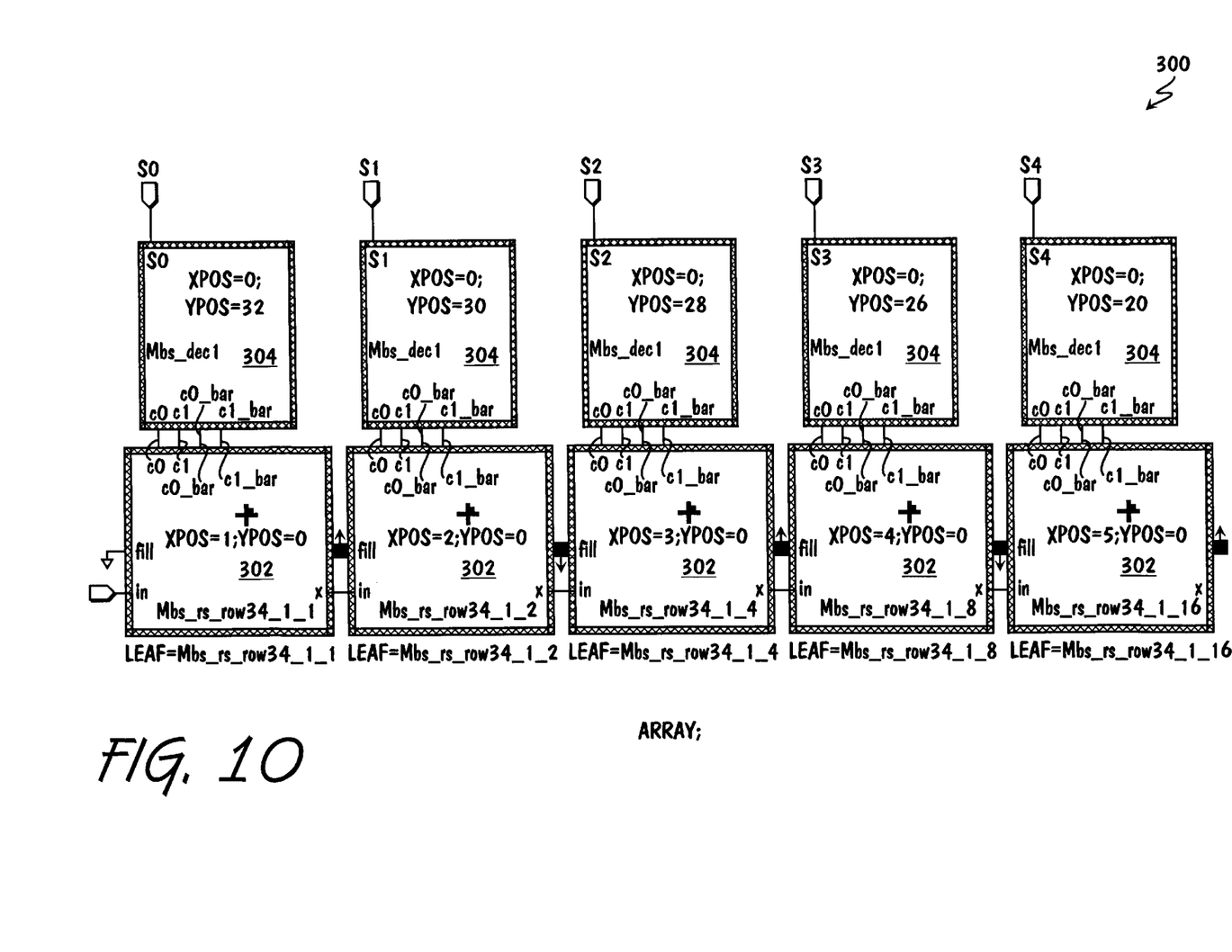
FIG. 10 illustrates one embodiment of the shifter portion of FIG. 1.

FIG. 10 illustrates one embodiment of shifter portion 300 of combined adder-shifter 110 of FIG. 1. As shown, for the illustrated embodiment, shifter portion 300 includes five rows of selection cells 302 and five decoders 304 correspondingly coupled to selection cells 302. Selection cells 302 shift the mantissa portion of a floating point operand in accordance with a number of control signals (i.e. c0, c1, etc.), which are generated by decoders 304 responsive to sum bits s0–s4. Those skilled in the art will appreciate that the left most selection cell-decoder pair may commence its portion of the shifting operation as soon as s0 is available. Similarly, each of the subsequent selection cell-decoder pair may also commence its portion of the shifting operation as soon as the corresponding sum bit is available and the preceding selection cell-decoder pair has completed.

Figure 11:
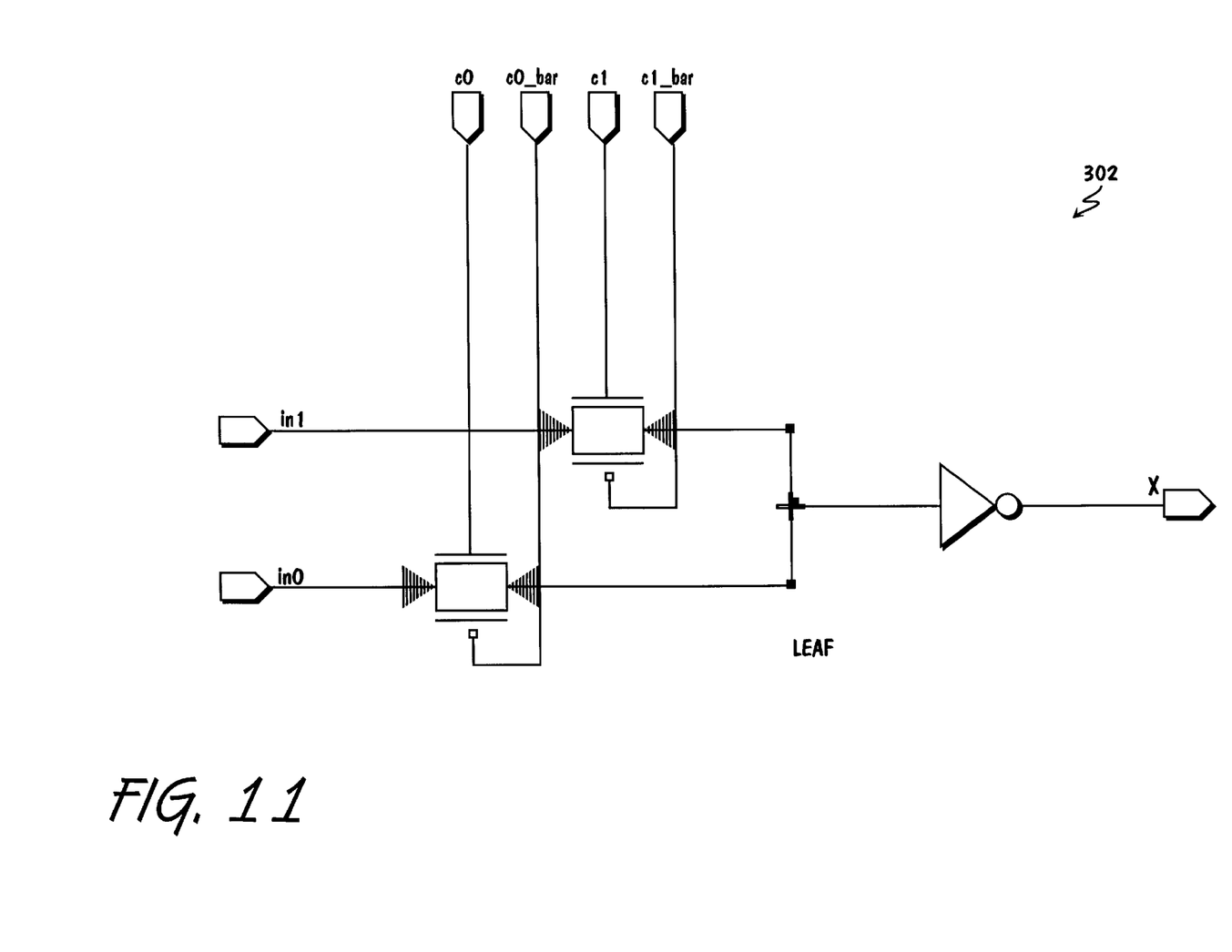
FIG. 11 illustrates one embodiment of a selection cell of FIG. 10.
Figure 12:
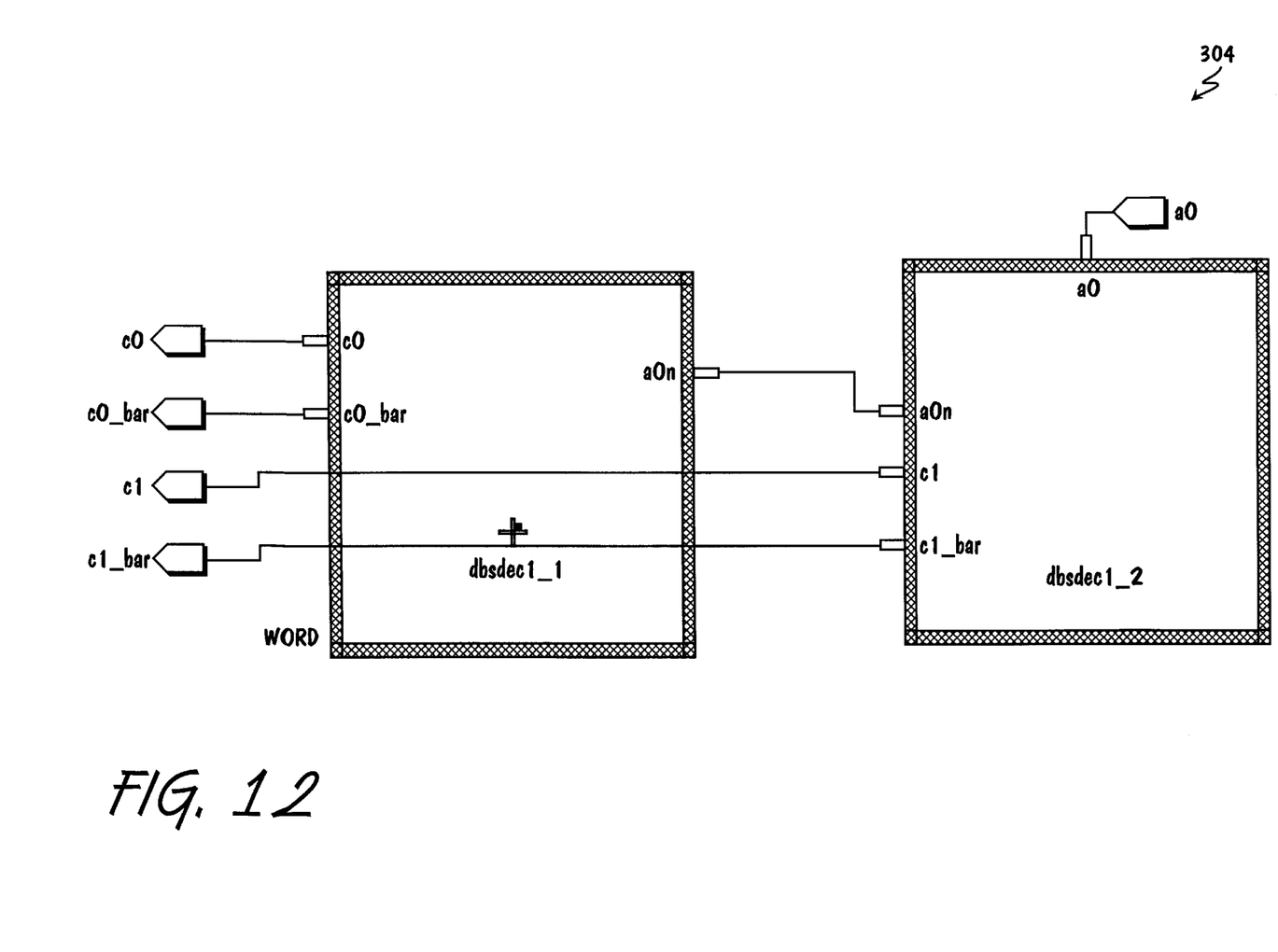
FIG. 12 illustrates one embodiment of a decoder cell of FIG. 10.

FIG. 11 illustrates one embodiment of cell 302 employing various transmission gates and inverters coupled to each other as shown. The operational of the circuit is apparent to those skilled in the art. FIG. 12 illustrates one embodiment of cell 304 including various inverters and buffers coupled to each other as shown. The operation of the circuit is also apparent to those skilled in the art. In practice, experience has shown that the propagation delays between the different shifting stages of shifter portion 300 complement that of the generation times of sum bits s0–s4, yielding the desired improvement to the combined performance.

Figure 13:
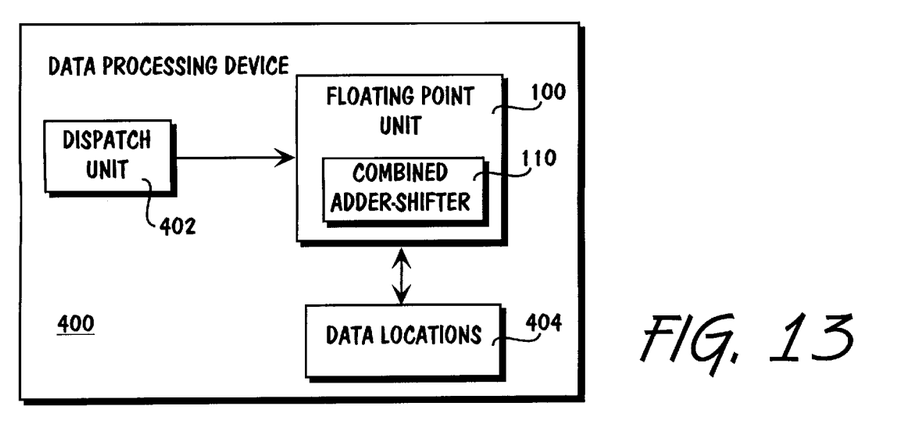
FIG. 13 illustrates a digital data processing device incorporated with the floating point unit of the present invention.

Turning now to FIG. 13, wherein one embodiment of a data processing device incorporated with the floating point unit of the present invention is shown. As illustrated, data processing device 400 includes dispatch unit 402, data storage 404 and floating point unit 100 (including combined adder-shifter 110) coupled to each other as shown. Dispatch unit 402 dispatches addition instructions to floating point unit 100, which in response performs the floating point operation, selectively retrieving the input operands and storing the output results from and to data storage 404 as instructed. Dispatch unit 402 and data storage 404 are intended to represent a broad range of such elements known in the art. In fact, data processing device 400 is intended to represent a broad range of such devices known in the art, including but not limited to microcontrollers, graphics accelerator, digital signal processors, audio and/or video signal processors, general purpose microprocessors, and so forth.

Figure 14:
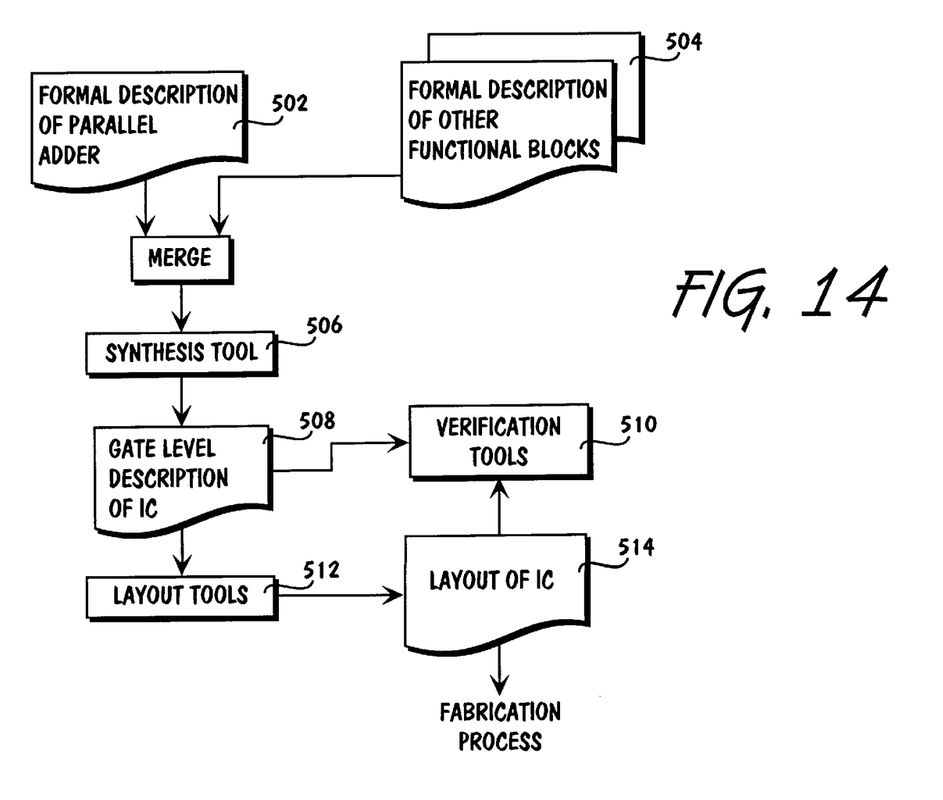
FIG. 14 illustrates one embodiment of a method for making an integrated circuit that includes the floating point unit of the present invention.

FIG. 14 illustrates one embodiment of a design process for designing a data processing device incorporated with the innovative floating point unit of the present invention is shown. As illustrated, a formal description 502 of the combined adder-shifter is prepared. Formal description 502 may be prepared in any one of the formal integrated circuit (IC) description languages known in the art, e.g., Very High Speed Integrated Circuit (VHSIC) Description Language, or VHDL, Verilog, and the like, using any one of a number of known design description editors supporting the desired formal description language.

Formal description 502 is then optionally merged with formal descriptions 504 of other function blocks of the IC, if the floating point unit is to be fabricated as an integral part of a "larger" IC. Formal description 502, or the merged formal descriptions 502 and 504, are then provided to synthesis tools 506 to synthesize, i.e. to generate, a gate-level description 508 of the IC to be fabricated. Formal description 502 is provided to synthesis tools 506 in a manner that allows the special design of the combined adder-shifter of the present invention to be directly incorporated into gate-level description 508, subsituting for the conventional implementations that would have been otherwise synthesized for the individual adder and shifter portions by synthesis tools 506. The gate-level description 508 may then be used by a number of verification tools 510, such as simulators or emulators, to verify the correctness of the design. An example of a verification tool is the SimExpress™ emulator product manufactured by Meta System of Saclay, France, a wholly owned subsidiary of the assignee of the present invention.

Upon verification, or in parallel, gate-level description 508 of the IC is then provided to layout tools 512 to generate physical layout description 514 of the IC. Layout description 514 is also subjected to verification by layout level ones of verification tools 510. An example of layout level verification is parasitic analysis for submicron level integration. Upon verification, layout description 514 of the IC is then provided to the fabrication process to fabricate the desired IC.

Those skilled in the art will appreciate that the design process and the fabrication process may be performed by different parties. In fact, the creation of formal description 502 may be performed by a party independent of the party or parties who prepare formal descriptions 504 for the other function blocks, and/or the party or parties who perform the synthesis, verifications, etc. Formal description 502 may be provided to these other parties via any one of a number of known data transfer methods, e.g. through removable storage medium such as magnetic tape, compact disk (CD), digital versatile disk (DVD), and the like, or through networked data communication links. In this context, formal description 502 is often referred to as a "soft core".

While the floating point unit of the present invention has been described in terms of the above illustrated embodiment, those skilled in the art will recognize that the invention is not limited to the embodiment described. The present invention can be practiced with modification and alteration within the spirit and scope of the appended claims. The description is thus to be regarded as illustrative instead of restrictive on the present invention.

Thus, a floating point unit having a unified adder-shifter design has been described.

What is claimed is:

1. A floating point unit comprising a combined adder-shifter that operates to shift a mantissa portion of at least one floating point operand to align the floating point operand with another floating point operand, the combined adder-shifter including:
   (a) an adder portion that operates to generate a plurality of sum bits for an exponent difference between the two floating point operands, favoring generation time performance of lower order ones of the sum bits over generation time performance of higher order ones of the sum bits, the adder portion including a plurality of computational cells, serially coupled to each other, capable of implementing a ripple carry scheme for lower order ones of bits employed to determine said exponent difference; and
   (b) a shifter portion coupled to the adder portion that operates to shift said mantissa portion of the at least one floating point operand in accordance with the sum bits.

2. A floating point unit comprising a combined adder-shifter that operates to shift a mantissa portion of at least one floating point operand to align the floating point operand with another floating point operand, the combined adder-shifter including:
   (a) an adder portion that operates to generate a plurality of sum bits for an exponent difference between the two floating point operands, favoring generation time performance of lower order ones of the sum bits over generation time performance of higher order ones of the sum bits, the adder portion including a plurality of computational cells, serially coupled to each other, capable of implementing a carry select scheme for higher order ones of bits employed to determine said exponent difference; and
   (b) a shifter portion coupled to the adder portion that operates to shift said mantissa portion of the at least one floating point operand in accordance with the sum bits.

3. The floating point unit of claim 2, wherein the adder portion further includes a plurality of selection cells correspondingly coupled to and capable to cooperate with the plurality of computational cells to implement said carry select scheme for said higher order ones of the bits employed to determine said exponent difference.

4. A storage medium having stored therein a plurality of machine readable instructions, which when executed by a program running on a processor, cause the program to effect the following:
   formally describe a floating point unit (FPU) for use in the design of in an integrated circuit (IC) that includes at least the FPU; and
   formally describe the FPU to include a combined adder-shifter designed to operate to shift a mantissa portion of at least one floating point operand to align the floating point operand with another floating point operand, wherein the combined adder-shifter includes:
   (a) an adder portion designed to operate to generate a plurality of sum bits for exponent difference between the two floating point operands, favoring generation time performance of lower order ones of the sum bits over generation time performance of higher order ones of the sum bits; and
   (b) a shifter portion coupled to the adder portion designed to operate to shift said mantissa portion of the at least one floating point operand in accordance with the sum bits, the shifter portion designed to be capable to correspondingly shift said mantissa portion when sequential ones of the sum bits become available,
   wherein the adder portion includes a plurality of computational cells, serially coupled to each other, implementing a ripple carry scheme for lower order ones of bits employed to determine said exponent difference.

5. A storage medium having stored therein a plurality of machine readable instructions, which when executed by an program running on a processor, cause the program to effect the following:
   formally describe a floating point unit (FPU) for use in the design of an integrated circuit (IC) that includes at least the FPU; and
   formally describe the FPU to include a combined adder-shifter designed to operate to shift a mantissa portion of at least one floating point operand to align the floating point operand with another floating point operand, wherein the combined adder-shifter includes:
   (a) an adder portion designed to operate to generate a plurality of sum bits for exponent difference between the two floating point operands, favoring generation time performance of lower order ones of the sum bits over generation time performance of higher order ones of the sum bits; and
   (b) a shifter portion coupled to the adder portion designed to operate to shift said mantissa portion of the at least one floating point operand in accordance with the sum bits, the shifter portion designed to be capable to correspondingly shift said mantissa portion when sequential ones of the sum bits become available,
   wherein the adder portion includes a plurality of computational cells, serially coupled to each other, implementing a carry select scheme for lower order ones of bits employed to determine said exponent difference.

6. The storage medium of claim 5, wherein the adder portion further includes a plurality of selection cells correspondingly coupled to and cooperate with the plurality of computational cells to implement said carry select scheme for said higher order ones of the bits employed to determine said exponent difference.

7. The storage medium of claim 6, wherein the shifter portion includes a plurality of selection cells coupled to each other to perform said shifting, the plurality of selection cells being responsive to a plurality of control signals generated based on said sum bits of the exponent difference.

8. The storage medium of claim 7, wherein the shifter portion further includes a plurality of decoder cells coupled to each other to generate said control signals using said sum bits of the exponent difference.

9. An apparatus comprising:
  (a) an instruction dispatch unit that operates to dispatch floating point instructions; and
  (b) a floating point unit (FPU) coupled to the instruction dispatch unit that operates to execute the dispatched floating point instructions, the FPU comprising a combined adder-shifter that operates to shift a mantissa portion of at least one floating point operand to align the floating point operand with another floating point operand, the combined adder-shifter including
    (b.1) an adder portion that operates to generate a plurality of sum bits for exponent difference between the two floating point operands of the floating point instructions, favoring generation time performance of lower order ones of the sum bits over generation time performance of higher order ones of the sum bits; and
    (b.2) a shifter portion coupled to the adder portion that operates to shift said mantissa portion of the at least one floating point operand of the floating point instructions in accordance with the sum bits, the shifter portion being capable to correspondingly shift said mantissa portion when sequential ones of the sum bits become available;
  wherein the adder portion includes a plurality of computational cells, serially coupled to each other, implementing a ripple carry scheme for lower order ones of bits employed to determine said exponent difference.

10. An apparatus comprising:
  (a) an instruction dispatch unit that operates to dispatch floating point instructions; and
  (b) a floating point unit (FPU) coupled to the instruction dispatch unit that operates to execute the dispatched floating point instructions, the FPU comprising a combined adder-shifter that operates to shift a mantissa portion of at least one floating point operand to align the floating point operand with another floating point operand, the combined adder-shifter including
    (b.1) an adder portion that operates to generate a plurality of sum bits for exponent difference between the two floating point operands of the floating point instructions, favoring generation time performance of lower order ones of the sum bits over generation time performance of higher order ones of the sum bits; and
    (b.2) a shifter portion coupled to the adder portion that operates to shift said mantissa portion of the at least one floating point operand of the floating point instructions in accordance with the sum bits, the shifter portion being capable to correspondingly shift said mantissa portion when sequential ones of the sum bits become available;
  wherein the adder portion includes a plurality of computational cells, serially coupled to each other, implementing a carry select scheme for lower order ones of bits employed to determine said exponent difference.

11. The apparatus of claim 10, wherein the adder portion further includes a plurality of selection cells correspondingly coupled to and cooperate with the plurality of computational cells to implement said carry select scheme for said higher order ones of the bits employed to determine said exponent difference.

* * * * *